United States Patent [19]

Willis

[11] Patent Number: 4,636,312

[45] Date of Patent: Jan. 13, 1987

[54] PLASMAPHERESIS FILTRATION MODULE HAVING IMPROVED END PLATE

[75] Inventor: Frank M. Willis, Wenonah, N.J.

[73] Assignee: E. I. Du Pont de Nemours and Company, Wilmington, Del.

[21] Appl. No.: 349,369

[22] Filed: Feb. 16, 1982

[51] Int. Cl.⁴ .............................................. B01D 13/00
[52] U.S. Cl. ................... 210/416.1; 210/433.2
[58] Field of Search ............... 210/195, 257, 258, 321, 210/409, 416.1, 422, 433, 443, 445, 456, 927

[56] References Cited

U.S. PATENT DOCUMENTS

| | | | |
|---|---|---|---|
| 3,211,645 | 10/1965 | Ferrari | 210/22 |
| 3,212,642 | 10/1965 | Kylstra | 210/321 |
| 3,342,328 | 9/1967 | Swenson | 210/321.1 X |
| 3,354,618 | 11/1967 | Dounoucos | 55/158 |
| 3,429,757 | 2/1969 | Nash | 156/70 |
| 3,541,005 | 11/1970 | Strathmann et al. | 210/19 |
| 3,684,097 | 8/1972 | Mathewson, Jr. et al. | 210/321 |
| 3,705,100 | 12/1972 | Blatt et al. | 210/23 |
| 3,774,762 | 11/1973 | Lichtenstein | 210/321.3 X |
| 3,966,616 | 6/1976 | Bray | 210/433.2 |
| 4,001,117 | 1/1977 | Trechsel | 210/180 |
| 4,075,091 | 2/1978 | Bellhouse | 210/19 |
| 4,110,220 | 8/1978 | Lavender | 210/456 X |
| 4,191,182 | 3/1980 | Popovich et al. | 128/214 |
| 4,212,742 | 7/1980 | Solomon et al. | 210/247 |
| 4,343,705 | 8/1982 | Legg | 210/433.2 X |

FOREIGN PATENT DOCUMENTS

| | | | |
|---|---|---|---|
| 2653875 | 6/1978 | Fed. Rep. of Germany | 210/433.2 |
| 2925143 | 1/1981 | Fed. Rep. of Germany | 210/433.2 |
| 167009 | 12/1980 | Japan | 210/321.2 |
| 01043 | 9/1980 | PCT Int'l Appl. | 210/321.2 |
| 1555389 | 11/1979 | United Kingdom | 210/433.2 |
| 2037614A | 7/1980 | United Kingdom | 210/433.2 |
| 2048114A | 12/1980 | United Kingdom | 210/321.2 |

OTHER PUBLICATIONS

Dorson et al., Chem. Eng. Prog. Symp. Ser. 64, 1968, pp. 85–89.
Driscoll et al., Trans. Amer. Soc. Artif. Int. Organs XXIII, 1977, pp. 470–478.
Bixler et al., Trans. Amer. Soc. Artif. Int. Organs XIV, 1968, pp. 99–108.

Primary Examiner—David Sadowski

[57] ABSTRACT

A plasmapheresis filtration module having stacked grooved plates interleaved with membrane filters, enclosed in a unitary, flexible, impermeable envelope, sealing being effected by pressing the membranes between blood flow channels and a sealing surface on a plasma side support, one of the plates being an end plate having reciprocatory pulse cavities therein.

24 Claims, 10 Drawing Figures 4,636,312

PLASMAPHERESIS FILTRATION MODULE HAVING IMPROVED END PLATE

FIELD OF THE INVENTION

This invention relates to plasmapheresis by filtration and, more particularly, to apparatus for plasmapheresis by membrane filtration.

BACKGROUND INFORMATION

Plasmapheresis is a process of separating plasma from whole blood. The plasma-depleted blood is comprised principally of cellular components, e.g., red blood cells, white blood cells and platelets. Plasma is comprised largely of water, but also contains proteins and various other noncellular compounds, both organic and inorganic.

Continuous plasmapheresis is the process of continuously removing whole blood from a subject, separating plasma from the blood and returning the plasma-depleted blood to the subject in a continuous extracorporeal circuit.

Plasmapheresis is currently used to obtain plasma for various transfusion needs, e.g., preparation of fresh-frozen plasma, for subsequent fractionation to obtain specific proteins such as serum albumin, to produce cell culture media, and for disease therapies involving either the replacement of plasma or removal of specific disease-contributing factors from the plasma.

Plasmapheresis can be carried out by centrifugation or by filtration. Generally, in known filtration apparatus, whole blood is conducted in a laminar flow path across one surface, i.e., the blood side surface, of a microporous membrane with a positive transmembrane pressure difference. Useful microporous membranes have pores which substantially retain the cellular components of blood but allow plasma to pass through. Such pores are referred to herein as cell-retaining pores. Typically, cell-retaining pore diameters are 0.1 μm to 1.0 μm.

Various filtration devices for plasmapheresis are disclosed in the literature. U.S. Pat. No. 3,705,100 discloses a center-fed circular membrane having a spiral flow path. U.S. Pat. No. 4,212,742 discloses a device having divergent flow channels. German Pat. No. 2,925,143 discloses a filtration apparatus having parallel blood flow paths on one side of a membrane and parallel plasma flow paths, which are perpendicular to the blood flow paths, on the opposite surface of the membrane. U.K. Patent Application 2,037,614 discloses a rectilinear double-membrane envelope in which the membranes are sealed together at the ends of the blood flow path. U.K. Patent Specification 1,555,389 discloses a circular, center-fed, double-membrane envelope in which the membranes are sealed around their peripheries. German Pat. No. 2,653,875 discloses a circular, center-fed double-membrane device in which blood flows through slot-shaped filter chambers.

It is an object of this invention to provide an end plate for use in a membrane filter module for plasmapheresis by reciprocatory pulsatile filtration.

DISCLOSURE OF THE INVENTION

Figure 1:
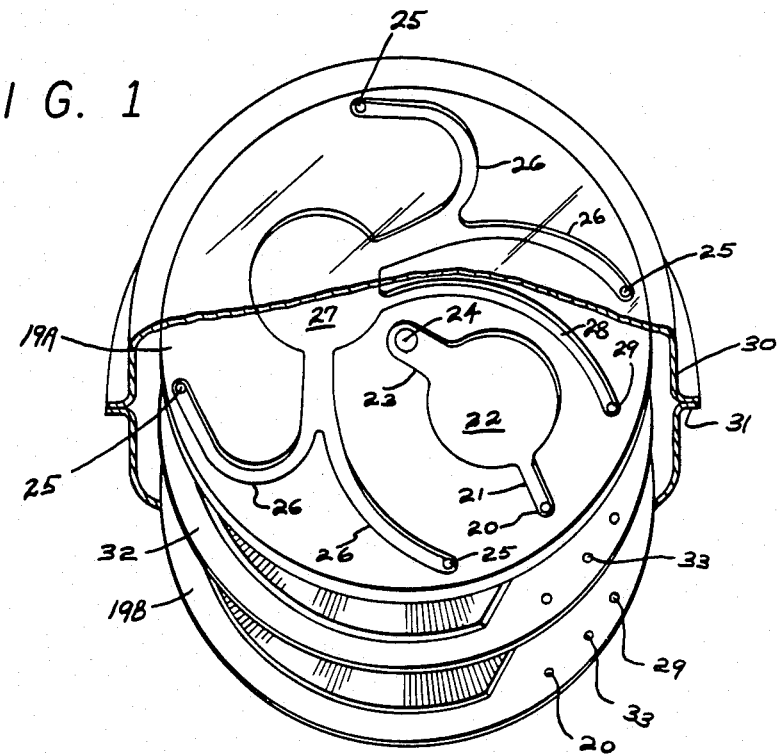
FIG. 1 is an exploded view of the preferred module of the invention.

For further comprehension of the invention and of the objects and advantages thereof, reference may be had to the following description and to the appended claims in which the various novel features of the invention are more particularly set forth.

The invention resides in an end plate for a plasmapheresis membrane filter module comprising a plate having inlet and outlet reciprocatory pulse cavities. The invention also resides in such an end plate which is planar and circular and in which a blood flow path inlet is centrally located and a blood flow path outlet is peripherally located and in such a circular end plate in which the outlet reciprocatory pulse cavity is connected to a plurality of approximately equidistant blood flow path outlets by approximately equi-volume channels.

Further, the invention resides in a plasmapheresis membrane filter module comprising such an end plate and such a module comprising preferred blood side and/or plasma side supports.

In the description and examples of the invention which follow, the term "forward" is used to indicate a direction generally away from the source of blood; "reverse" indicates a direction generally towards the source of blood. Transmembrane pressure difference is determined by subtracting the pressure on the plasma side, i.e., the second surface of the membrane, from the pressure on the blood side, i.e., the first surface of the membrane. "Cell-retaining pores" means pores which substantially retain cellular components but allow plasma to pass through the membrane.

Plasmapheresis by filtration is enhanced by the use of fouling-reducing techniques, e.g., pulsatile flow, reciprocatory pulsatile flow and high blood flow rate via recirculation. Plasmapheresis by reciprocatory pulsatile flow, which is the invention of one other than the inventor herein and which is disclosed and claimed in application Ser. Nos. 287,116 filed July 22, 1981 and 349,371 filed Feb. 16, 1982, both expressly abandoned, and 478,812 filed Mar. 30, 1983, comprises the steps of:

(1) conducting blood in a forward direction over a first surface, i.e., a blood side surface, of each of one or more membranes having cell-retaining pores;

(2) terminating the forward conducting of blood over the first surface of each membrane;

(3) conducting the blood in the reverse direction over said first surface, the volume of blood flowed in the reverse direction being less than the volume of blood flowed in the forward direction in step (1);

(4) repeating steps (1)–(3) in sequence and collecting plasma which passes through each membrane from a second surface, i.e., a plasma side surface, thereof and collecting plasma-depleted blood from said first surface.

Other steps may also be included, e.g., recycling the plasma-depleted blood, treating plasma during filtration, diluting the blood with a compatible fluid and measuring various biologically significant factors.

From the location at which the blood first contacts the membrane, which may or may not be near a point on an edge or end of the membrane, blood is conducted in a forward direction in one or more flow paths. A flow path is the space through which the blood flows on the first surface of the membrane. Typically the depth of blood in each flow path is less than about 30 mils (0.76 mm).

Plasma is driven through the cell-retaining pores in the membrane by a positive transmembrane pressure difference. Typically, positive transmembrane pressure difference is generated primarily by resistance to forward blood flow, but it can also be generated in other ways, e.g., by decreasing pressure on the plasma on the second surface.

The amount of transmembrane presssure difference that can be withstood by blood without hemolysis is largely a function of cell-retaining pore size which is, typically, 0.1 to 1.0 μm diameter. For most purposes, the preferred pore diameter is about 0.4 to 0.6 μm. In this range, a positive transmembrane pressure difference of no more than about 4 psi (28 kPA) is desirable. When the pore diameter is smaller or larger, higher or lower transmembrane pressure differences, respectively, are acceptable, although it is preferred that the transmembrane pressure difference be kept low, e.g., below about 1.5 psi (10 kPa).

After the forwarding conducting of blood, the blood is conducted in the reverse direction in each flow path. The frequency and volume of the reciprocatory pulses are selected to maximize the flow of plasma through the membrane without causing extensive blood trauma. In planar blood flow paths having a height of about 4 to 10 mils (102 to 254 μm), a useful frequency and volume are about 20 to 140 pulsations per minute and 0.5 to 4 mL per pulsation, preferably about 3 mL. Said parameters should be selected to provide a mean linear velocity up to about 400 mm-sec$^{-1}$, preferably, up to about 250 mm-sec$^{-1}$. The net volume of blood flowed in the reverse direction is less than the net volume of blood flowed forward.

The blood which approaches the ends of each flow path is plasma-depleted blood. It is collected and conducted away from the module by any suitable means, as is the plasma which flows through the membrane.

Any type of useful membrane(s) in any suitable shape, configuration or arrangement, including, e.g., hollow fibers, can be used. Similarly, any suitable means can be used to conduct blood to the membrane and plasma-depleted blood and plasma from the membrane.

Referring now to the drawings, which are illustrative only, FIGS. 1 to 7 illustrate planar membrane modules, which are the invention of a different inventive entity, having an end plate which has reciprocatory pulse cavities integral therewith. Referring to FIG. 1, which illustrates a partially exploded view of the module, the module comprises a clampable stack of plates 19A, 19B, 32, between which, suitable membranes, not shown, are interleaved. The plates are flexible and require external structural support, such as is described below with reference to FIGS. 5 and 6, to effect sealing and to compensate for compliance and tolerance within the module. Blood is conducted into the module via module inlet 20 in end plate 19B and is conducted through matched ports in plates 32, 19A. End plate 19A is about 0.19 inch (4.8 mm) thick; end plate 19B and plate 32 are about 0.08 inch (2.0 mm) thick; the module is about 8 inches (0.2 m) in diameter.

From module inlet 20 in end plate 19A, the blood is conducted through shallow channel 21, 0.2 inch (5.1 mm) wide × 0.06 inch (1.5 mm) deep, into inlet reciprocatory pulse cavity 22 which has a volume of about 3 mL and is about 2 inches (50.8 mm) in diameter × 0.06 inch (1.5 mm) deep. Cavity 22 is employed in the generation of reciprocatory pulsations as described below. From cavity 22, the blood is conducted through shallow channel 23, 0.5 inch (127 mm) wide × 0.13 inch (3.3 mm) deep, to blood flow path inlet 24 which is about 0.38 inch (9.7 mm) in diameter, i.e., cavity 22 is between module inlet 20 and blood flow path inlet 24. The blood is conducted through port 24, and through a matched port in plate 32 and in the membranes, to blood flow paths lying between each membrane and one surface of a plate; e.g, on a membrane lying between end plate 19A and adjacent plate 32, the blood flow path is between the membrane and the interior surface of end plate 19A, which is a blood side support, as illustrated for plate 32 in FIG. 2. The blood in the blood flow paths is conducted radially to plasma-depleted blood collection channels and from there, through matched flow path outlets 25 and through branch channels 26 to outlet reciprocatory pulse cavity 27 in end plate 19A. The branch channels from the four outlets 25, which are equidistant from each other, begin as four channels each about 0.250 inch (6.4 mm) wide × 0.060 inch (1.5 mm) deep and merge into two channels each about 0.500 inch (12.7 mm) wide × 0.060 inch (1.5 mm) deep. The branch channels are of equal length and cross-section so as to produce substantially equal pressure conditions during use. Cavity 27 is also employed in the generation of reciprocatory pulsations as described below. From cavity 27, the plasma-depleted blood is conducted through shallow channel 28, 0.200 inch (5.1 mm) wide × 0.060 inch (1.5 mm) deep, and through module plasma-depleted blood outlet 29 which extends through matched ports in plates 32, 19B, i.e., cavity 27 is between blood flow path outlets 25 and module plasma-depleted blood outlet 29.

Figure 3:
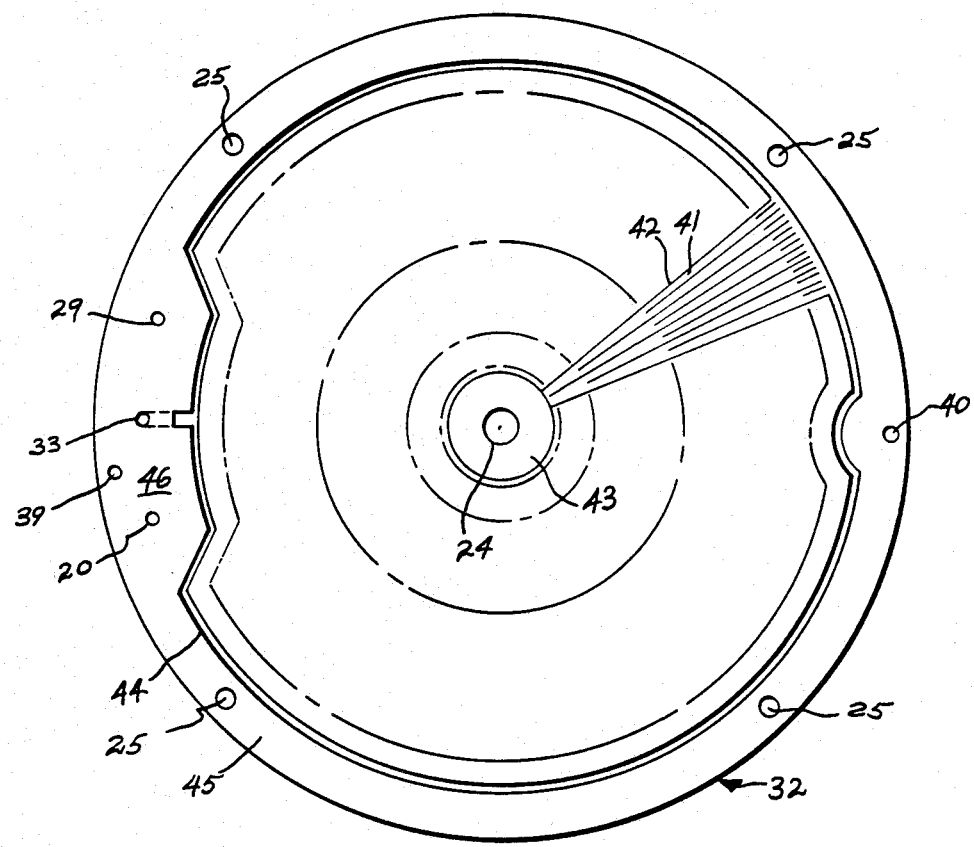
FIG. 3 is a plan view of a plasma side support of the module of FIG. 1.

Plasma which passes through the membranes flows radially in a plasma flow path, e.g., on the membrane which lies between end plate 19A and adjacent plate 32, the plasma flow path is between the membrane and plate 32. The plasma flow path is comprised of radial flow channels which culminate in a perimeter plasma collection channel, as illustrated by FIG. 3, from which the plasma passes through matched ports 33 in plates 32, 19B and out of the module. A section of plasma flow channels are also illustrated in FIG. 1.

Figure 5:
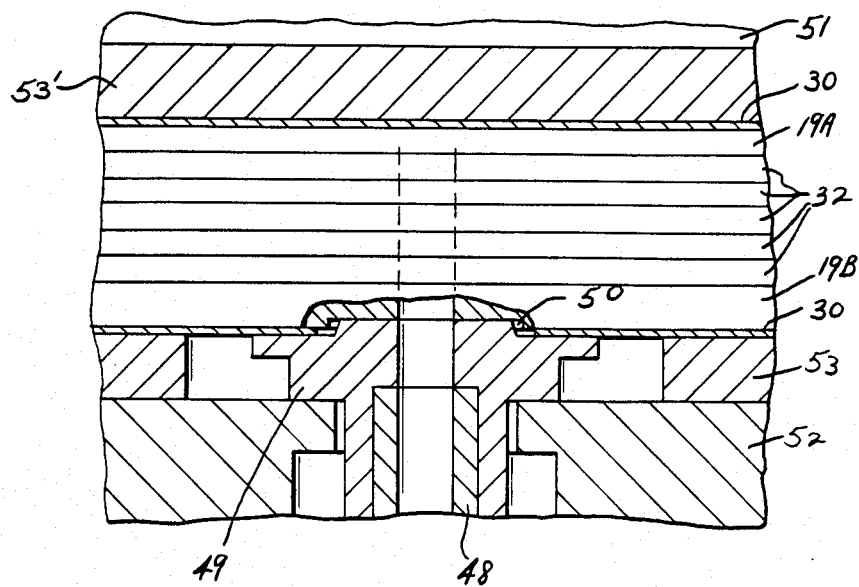
FIG. 5 is an elevational view in cross-section of the attachment of an inlet or outlet tube to the module of FIG. 1.

The entire module is enclosed by envelope 30, which is cut away for purposes of illustration. It is comprised of two sheets of a flexible blood-impermeable material, such as poly (vinyl chloride), the sheets being joined together at seal 31 around the perimeter of the stack. The envelope thus provides a unitary flexible enclosure for the module which retains the plates and membranes in proper relationship. The three apertures 20, 29, 33 in end plate 19B mate with tube connections in envelope 30 as illustrated in FIG. 5.

Figure 7:
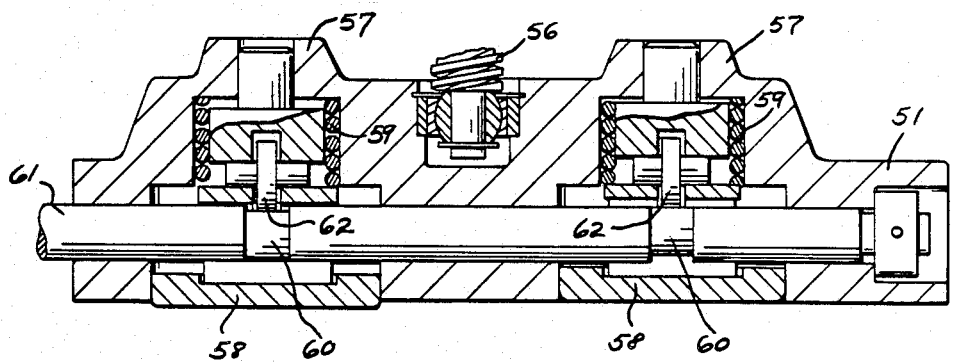
FIG. 7 is an elevational view in cross-section of reciprocating plungers used with the module of FIG. 1.

Envelope 30 covers and seals the various channels, cavities and apertures in end plate 19A and forms a flexible diaphragm over each cavity 22, 27. A perimeter lip, not shown, around each cavity and channel in end plate 19A aids in sealing. Reciprocatory pulsations are generated by alternately compressing the diaphragm over each of cavities 22, 27. Reciprocating plungers which are useful for this purpose are illustrated by FIG. 7.

Figure 2:
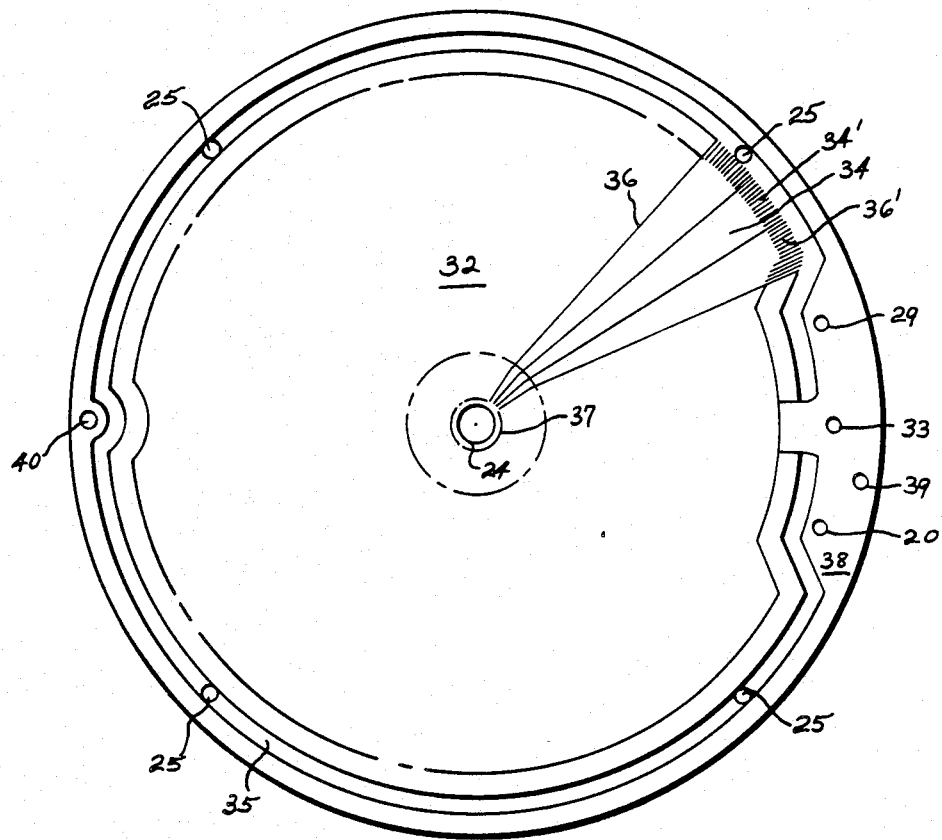
FIG. 2 is a plan view of a blood side support of the module of FIG. 1.

FIG. 2 illustrates a blood side support comprised of plate 32, a surface of which is provided with recessed radial blood flow channels 34. Between channels 34 are ridges 36. The channels 34 extend from counterbore 37 around inlet 24. For purposes of illustration, only a section of enlarged blood flow channels are shown. In fact, ninety channels 34 extend around the entire perimeter of inlet 24 although more or fewer of such channels may be employed. The channels 34 are at least about 4 mils (0.1 mm) deep, preferably about 4 to 10 mils (0.1 to 0.3 mm). They are narrow around the inlet and increase in width from about 8 mils (0.2 mm) to about 250 mils (6.4 mm). The counterbore is about 20 mils (0.5 mm) deep and 0.5 inch (12.7 mm) in diameter. Around the perimeter of flow channels 34 is perimeter plasma-depleted blood collection channel 35 which leads to plasma-depleted blood outlet ports 25. Between flow channels 34 and collection channel 35 are blood pressure balancing and sealing grooves comprising a perimeter border of short narrow channels 34', each about 4 to 30 mils (0.1 to 0.8 mm) wide. Between perimeter channels 34' are ridges 36'. Perimeter channels 34' enhance uniform distribution of pressure and flow within the blood flow channels by causing increased velocity and hence increased pressure drop across the perimeter channels.

In region 38, the channels are spaced inward from the edge of the plate so as to avoid intersecting any of ports 20, 33, 29. The channels 34 are offset from radial plasma flow channels on a plasma side support so that the ridges between the blood flow channels and the ridges between the plasma flow channels will not be contiguous but rather will intersect, thus minimizing the risk of membrane shearing; in the illustrated embodiment, approximately the outer 80% of the axes of the flow channels 34 are angled slightly from a pure radial direction. Also to minimize the risk of shearing, the ridges between the channels preferably have flat surfaces, e.g., about 3 to 10 mils (0.1 to 0.3 mm) wide.

Alignment pins 39 and 40 fit snugly into aligned holes in each plate 19A, 19B, 32 thus maintaining the plates in the proper relative orientation.

The preferred plasma side support, opposite the blood side support, is illustrated by FIG. 3. The plasma side support comprises the other surface of plate 32, having plasma flow channels 41 recessed in one surface thereof with ridges 42 therebetween. The plasma flow channels 41 extend from an inlet sealing surface 43 in zones of progressively greater numbers to a perimeter plasma collection channel 44, which is about 0.07 inch (1.8 mm) wide × 0.030 inch (0.8 mm) deep. For purposes of illustration, only a section of enlarged plasma flow channels are shown in the Figure. By progressively increasing the numbers of plasma flow channels, closely-spaced ridges, which provide support of the membrane, are maintained. In the illustrated plasma side support, the number of plasma flow channels doubles in each succeeding zone so that in the innermost zone there are 90 such channels and in the outermost zone there are 1440 such channels.

In the center of plate 32 is blood flow path inlet 24, e.g., about 0.39 inch (9.9 mm) in diameter, which is in registry with blood flow path inlet 24 in plate 19A.

Inlet sealing surface 43 is an area on the plasma side support which is coplanar with the nonrecessed areas of the support. It is opposite narrow blood flow channels on an opposing blood side support so that when the supports are pressed together with a membrane therebetween, blood is substantially prevented from leaking into plasma flow regions without the use of adhesives or gaskets. Surface 43 is a circular area, concentric with inlet 24 and of larger diameter, e.g., about 1 inch (25.4 mm). Preferably, it is an inlet sealing boss although other elements can be used, e.g., an annular insert. It substantially prevents blood from leaking from inlet 24 to plasma flow channels 41. The plasma collection channel 44 is located within a smaller radius than the short, narrow channels 34' on plate 19A. Between the plasma collection channel 44 and the edge of plate 32 is a perimeter sealing surface 45 which can be pressed against channels 34', there being a membrane therebetween, effecting a seal in a manner similar to the seal around inlet 24.

From the plasma collection channel 44, plasma flows to plasma outlet 33. As with the blood side support, the channels are spaced inward from the edge of the plate in region 46.

The interior surface of plate 19A in FIG. 1 also comprises a blood side support identical to that shown in FIG. 2. Several plates 32 can be stacked to permit use of a desired number of membranes, the preferred number being four to six. The last plate, i.e., end plate 19B, comprises a plasma side support, on its interior surface, which is identical to the plasma side support illustrated in FIG. 3 except that end plate 19B is not apertured with blood flow path inlet 24. On its exterior surface, end plate 19B is plain.

Figure 4:
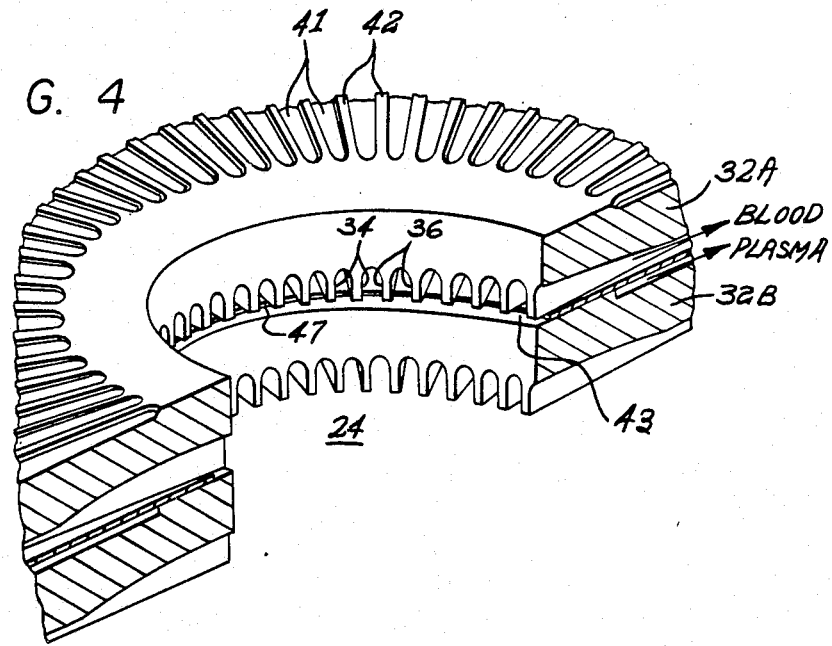
FIG. 4 is a cross-sectional view of a central sealing region in the preferred module of FIG. 1.

FIG. 4 illustrates the central sealing design of the module and the preferred blood flow path entrance design. The membrane 47 is pressed between the blood side support surface of one plate 32A and the plasma side support surface of a second plate 32B. In this figure, there is no counterbore around the inlet on the blood side support as there is in FIG. 2. Membrane 47 bridges the narrow blood flow channels around inlet 24 and is squeezed against central sealing boss 43 of the next plate, acting in this region as seal members in a manner similar to a check valve. By employing channels which are about 4 to 20 mils (0.1 to 0.5 mm), preferably 6 to 10 mils (0.2 to 0.3 mm), in width, under usual operating conditions, i.e., pressures up to about 3 psi (21 kPa), the membrane seal has been found to substantially prevent leakage of blood, even when reciprocatory pulsatility is employed, when the module is pressed between clamp jaws.

As can be seen in FIG. 4, the entrance to each blood flow channel is initially deep but uniformly decreases in depth, as the flow channels widen, such that the cross-sectional area of each is substantially maintained while the depth is decreased. This design enhances uniform flow in the module and allows the flow conditions in the thin channels to be attained more gradually than if the entrances to the channels were also thin. The initial depth is greater than about 10 mils (0.3 mm), preferably about 15 to 20 mils (0.4 to 0.5 mm) and is gradually decreased to about 4 to 10 mils (0.1 to 0.3 mm).

Envelope 30 allows the module to be purged of air and filled with a liquid, e.g., saline, prior to use. When the module is used, this saline solution is swept out of the flow channels by blood and plasma but remains around the periphery of envelope 30 in the region of seal 31. Any blood which may leak into this solution in this region remains there by a check-valve action, due to the seal between perimeter channels 34' and the perimeter sealing boss 45, illustrated in FIGS. 2 and 3, similar to that described for the sealing region surrounding inlet 24 in FIG. 4.

As shown in FIG. 5, tube 48 connections to the apertures 20, 33, 29 are made by joining flanged plastic fittings 49 to the plastic envelope 30 on the bottom of the unit as seen in FIG. 1. No direct connection is made to any of the plates 19B, 19A, 32; however, the fittings are urged against the envelope 30 and into shallow counterbores 50 in end plate 19B by means of a clamping mechanism, namely, jaws 51, 52. Counterbores 50 prevent the plates from moving relative to the envelope during use. Jaws 51, 52, faced with elastomer 53, 53', engage envelope 30 at the top of plate 19A and the bottom of plate 19B and, in addition to holding the tube fittings, urge the stacked plates together in leak-tight condition resisting the hydrostatic pressure of the blood being pumped through the module. Unit pressures within the module are in the order of 0.5 to 3 psi (3.4 to 20.7 kPa) on an area of 40 sq. in. (250 sq.mm) resulting in clamp loadings of up to about 120 lb. ($54.4 \times 10^3$ gm). The clamp must provide sufficient external pressure to offset this internal pressure as well as to compensate for compliance and manufacturing tolerances. This external pressure should be evenly distributed.

Figure 6:
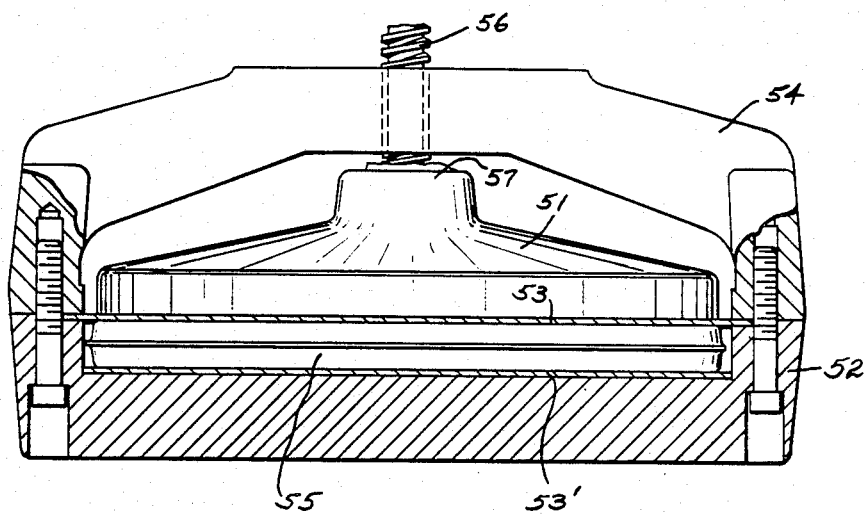
FIG. 6 is a cross-sectional view of a module of the invention pressed between clamp jaws.

Referring to FIG. 6, jaw 52 is a rectangular platen having yoke 54 bolted thereto. Yoke 54 has four legs, two shown; the number of legs is not critical. Jaw 51 is a floating and self-aligning circular platen of larger diameter than module 55 which is pressed against module 55 by means of central gear-reduced screw 56 extending through yoke 54 and connected to jaw 51 by means of a swivel joint, not shown. A gear reducing mechanism, not shown, is fitted to the top of yoke 54. Two bosses 57, shown cut off, are on either side of screw 56 and house reciprocating plungers, as further described below with reference to FIG. 7. Elastomer 53, 53' lie between jaws 51, 52 and module 55. A guide pin, not shown, extending through yoke 54 to jaw 51 is used to properly align jaw 51 with module 55 upon clamping. It has been found that use of such a clamping mechanism provides nearly uniform pressure across the module and provides structural support external to the module, thereby lowering the cost of the module which is a disposable unit.

FIG. 7 illustrates the reciprocating plungers of a pulse generator integral with jaw 51. It is a cross section taken perpendicular to the cross section of FIG. 6. Jaw 51 has bosses 57 for two parallel bores occupied by plungers 58 which are shouldered to carry springs 59 which urge the plungers toward reciprocatory pulse cavities. The plungers are lifted 180° out of phase with each other by means of eccentrics 60 on a common shaft 61 which is carried in bearings, not shown, and is extended outside the bar for a belt connection to a motor drive, not shown, which is mounted on brackets, not shown, extending from jaw 51. The eccentrics 60 each engage a roller 62 in a slot in each plunger 58. Each roller 62 is carried on a wrist pin in the plungers. The throw of the eccentrics is about 0.030 inch (0.8 mm) producing a plunger stroke of about 0.060 inch (1.6 mm). The eccentric shaft drives the pistons down away from the diaphragm compressing the springs and storing energy. The pistons are returned by the springs which limit the maximum force and resulting pressure which can be generated by the piston on the diaphragm over each cavity. This also limits jamming damage should the unit be installed misaligned or with a foreign body in the clamp cavity area. The plungers displace equal volumes forward and reverse.

The bottom of jaw 51 is pressed against plastic envelope 30 by the clamp so that the plunger heads 58 enter reciprocatory pulse cavities. Rotation of shaft 61 causes diaphragm-like deflections in envelope 30 and produces a pumping action on fluids in the cavities. This action is oscillatory, causing reciprocatory pulsatile flow on the surfaces of the membranes. Because the reciprocatory pulse cavities are integral with the modular assembly of stacked plates and membranes, there is minimal addition to the average hold-up time of the blood being processed and each flow fraction receives uniform treatment.

Figure 8:
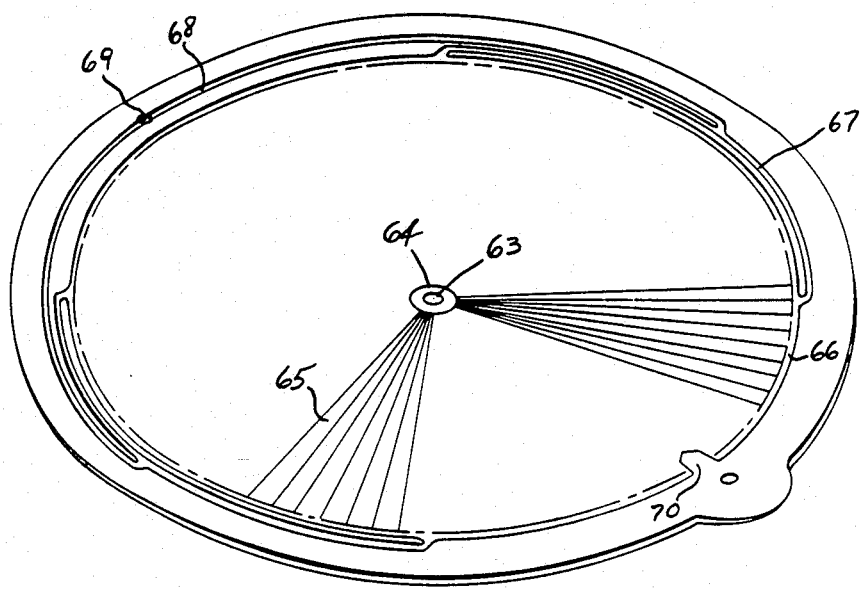
FIG. 8 is a perspective view of an alternative blood side support which may be used in a module of the invention.
Figure 9:
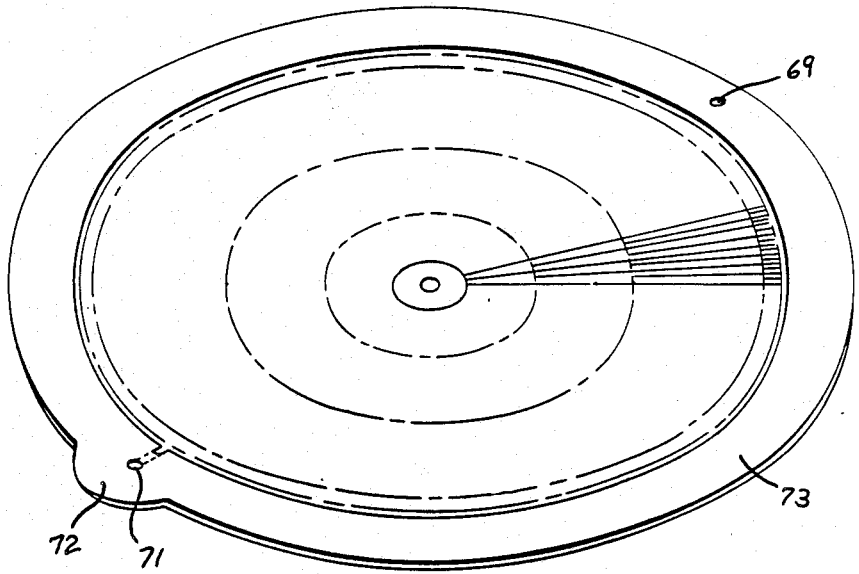
FIG. 9 is a perspective view of a plasma side support which may be used with the blood side support of FIG. 8.

FIGS. 8 and 9 illustrate, respectively, an alternative blood side support and an alternative plasma side support which may be used in a second illustrative embodiment of a module of the invention and which are the invention of a different inventive entity. Referring to FIG. 8, at the center of the plate is blood flow channel inlet 63 surrounded by counterbore 64, which is about 0.5 inch (12.7 mm) in diameter and about 20 mils (0.5 mm) in depth. From the counterbore, radial flow channels 65, shown enlarged and in part, are narrow around the inlet and extend to a perimeter plasma-depleted blood collection channel which is a series of plasma-depleted blood collection channels 66, 67, 68. These channels lead to plasma-depleted blood outlet 69. In the illustration is shown a first perimeter channel 66 which has four equidistant exits to intermediate channels 67 each of which in turn has an exit to final channel 68. Each channel is about 0.070 inch (1.8 mm) wide × 0.030 inch (0.8 mm) deep. These channels comprise blood pressure balancing and sealing grooves serving in this regard, the same purpose as the perimeter border of short narrow channels 34' in FIG. 2. The channels are spaced inward in region 70 to avoid plasma channels and ports.

FIG. 9 illustrates a plasma side support which may be used with the alternative blood side support of FIG. 8. It differs from the plasma side support described above in FIG. 3 in the locations of blood outlet 69 and plasma outlet 71, the latter of which is in a protrusion 72 from the edge of the plate in order to avoid the various blood flow channels and ports. Sealing around the inlet is accomplished as illustrated above in FIG. 4. Sealing around the perimeter is effected by a check-valve-like action resulting from pressing a membrane between channels 66, 67, 68 on the blood side support and perimeter sealing surface 73 on the plasma side support, in a manner similar to, though not as effective as, that described above with reference to FIGS. 3 and 4.

A third illustrative embodiment employs a module which is the invention of one other than the inventor herein. It comprises first and second opposing module housing plates one of which is an end plate of the invention, and having a blood flow region, and a plasma flow region recessed within opposing surfaces, there being a central blood inlet connected to the blood flow region, a blood collection channel around the blood flow region connected to a plasma-depleted blood outlet and a plasma collection channel around each plasma flow region connected to a plasma outlet; a plasma side support within the plasma flow regions; and a pair of membranes between each plasma flow region and the blood flow region. The module is preferably circular and preferably has blood side supports between the membranes.

Figure 10:
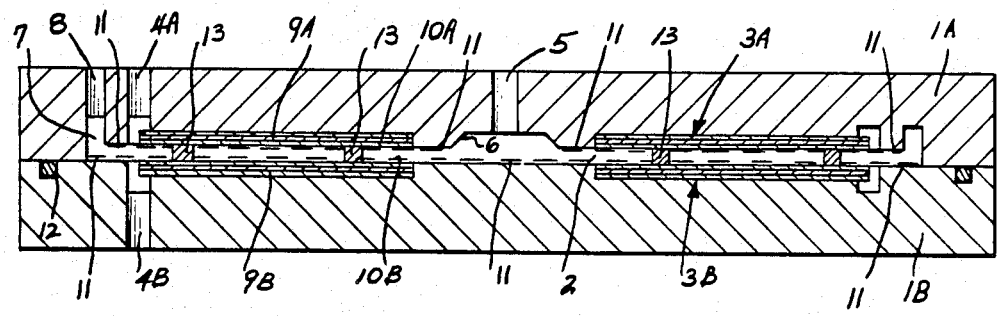
FIG. 10 is a cross-sectional view of an alternative module which may comprise the end plate of the invention.

Referring to FIG. 10, the module comprises two opposing circular module housing plates 1A, 1B which are prepared from a blood-compatible material. Plate 1A is an end plate of the invention; the reciprocatory pulse cavities are not illustrated in this Figure. A circular blood flow region 2 is recessed within an opposing surface of one or both plates. Further recessed within each plate is a plasma flow region 3A, 3B. Typically, though not necessarily, the plasma flow region is of smaller diameter than the blood flow region.

The depth of the plasma flow region is typically about 5 to 20 mils (127 to 508 $\mu$m). The surface of the plasma flow region may be smooth or grooved to enhance radial flow of plasma. In the plasma flow region, or connected thereto, may be means for treating the plasma for the removal of disease-contributing factors.

One or both plates 1A, 1B have plasma outlet ports 4A, 4B connected to the plasma flow regions 3A, 3B via a plasma collection channel around the plasma flow region, e.g., about 3 mm deep and 1.5 mm wide. There may be one or more of such ports in either or both plates. The ports and channel may be located at any position but preferably, as herein illustrated, are located near the periphery of each plasma flow region.

Near the center of plate 1A is blood inlet port 5, the walls 6 of which extend through plasma flow region 3A to the blood flow region 2. Around the periphery of blood flow region 2 is a plasma-depleted blood collection channel 7. This channel connects to one or more plasma-depleted blood outlet ports 8.

Within each plasma flow region is plasma side membrane support 9A, 9B which may be, e.g., a plate having grooves, pores or projections or fabric-like materials. The plasma side supports in the Figure are comprised of layers of fabric-like materials, such as layers of a nonwoven polyester fabric, such as Hollytex made by calendering Du Pont Reemay ® spunbonded polyester. This support provides adequate support while allowing transverse and radial flow of plasma. Support 9A which fits in plasma flow region 3A is provided with an aperture which fits around wall 6 of blood inlet port 5.

Within each blood flow region is membrane 10A, 10B. Membrane 10A which fits in blood flow region 2 is provided with an aperture which lies in registry with blood inlet port 5.

Membranes 10A, 10B are adhered to the plates near the peripheral edges of the membranes and, in the case of the membrane 10A, near the edge of the aperture which is in registry with blood inlet port 5, with an elastomeric adhesive. The areas of the plates 1A, 1B to which membranes 10A, 10B are adhered are identified in FIG. 10 by the number 11.

It has been found that when thin polycarbonate or polyester membranes which have low break elongation, i.e., less than about 40%, are employed in filter modules in which, as herein illustrated, the membranes are not rigidly supported across a large part of their surface areas, it is advantageous to employ an elastomeric seal between the membranes and supports. Use of an elastomeric seal provides sufficient flexibility to avoid rupture of the membranes during use. When such membranes are employed, the seal preferably has a break elongation of at least about 100%. The optimal break elongation will depend on several factors which will be obvious to persons skilled in the art, including the thickness of the seal. An elastomeric seal which has been found to perform well with such membranes is an adhesive having a break elongation of about 400% and applied in a layer about 3 mils (76 $\mu$m) thick. This is the invention of one other than the inventor herein.

When the module is assembled, the corresponding flow regions of each plate are adjacent. The plates are held together by any suitable means, e.g., clamps, bolts and adhesives. O-ring 12 can be used to seal the plates. The region between the membranes is the blood flow path. The total effective surface area of the membranes, i.e., the sum of the areas on both membranes over which blood can flow, is typically about 0.02 to 0.06 $m^2$.

Blood side supports 13 are located between the membranes. Blood side supports, though not necessary, have been found to be particularly useful when nonrigid plasma side supports, such as layers of Hollytex, which may tend to buckle during use, are employed. Various suitable supports are described in the literature. The illustrated supports comprise a plurality of smooth pillars, e.g., substantially circular, dots of a material which has sufficient softness to avoid breakage of the membranes during use, such as an elastomeric adhesive. Conveniently, the same adhesive which is used to adhere the membranes to the plates can be used to form the blood side supports.

BEST MODE

The best mode for carrying out the invention is illustrated by FIGS. 1 through 7.

While the preferred embodiment of the invention is described by the above, it is to be understood that the invention is not limited to the precise constructions disclosed herein and that the right to all changes and modifications coming within the scope of the following claims is reserved.

I claim:

1. In a membrane filter module for carrying out a continuous plasmapheresis under reciprocatory pulse blood flow conditions whereby blood is conducted in a forward direction over a first surface of each of a plurality of membranes having cell retaining pores, while maintaining a net positive transmembrane pressure difference, the forward conducting of blood is terminated and the blood is conducted in a reverse direction over said surface, the volume of blood flowed in the reverse direction being less than the volume flowed in the forward direction, the transmembrane pressure difference being reduced during the forward and the reverse blood flow conducting periods, and the forward and reverse conducting steps being repeated and plasma being collected from a second surface of each of the membranes, said membrane filter module comprising:

(a) first and second opposing module housing end plates having therebetween at least one blood flow region and at least one plasma flow region, there being a blood inlet port connected to the blood flow region; a blood collection channel, around the blood flow region, connected to a plasma-depleted blood outlet port; and a plasma collection channel around the plasma flow region connected to a plasma outlet port;

(b) a plasma-side support within each plasma flow region; and (c) a membrane, having cell-retaining pores, between each plasma flow region and blood flow region, and a blood flow path over the membrane, the improvement whereby the module comprises (a) a module housing plate which is an end plate of the module and which has blood inlet and outlet reciprocatory pulse cavities; and (b) a sealing envelope which encloses the module and which forms a flexible diaphragm over the cavities of the end plate.

2. The end plate of claim 1 having one inlet reciprocatory pulse cavity between a module inlet and a blood flow path inlet and one outlet reciprocatory pulse cavity between a blood flow path outlet and a module plasma-depleted blood outlet.

3. The end plate of claim 2 in which the inlet and outlet cavities are of the same volume.

4. The end plate of claim 2 which is planar and circular and in which the blood flow path inlet is centrally located and each blood flow path outlet is peripherally located.

5. The end plate of claim 4 in which the outlet cavity is connected to a plurality of blood flow path outlets which are equidistant from each other, by channels which are of equal length and cross-section.

6. Module of claim 4 which comprises a blood side support having radial blood flow channels.

7. Module of claim 6 which comprises a plasma side support having radial plasma flow channels.

8. Module of claim 7 which comprises a plurality of membranes, each between a blood side support and a plasma side support.

9. Module of claim 8 in which each plasma side support has an inlet sealing surface and each blood side support has narrow blood flow channels opposite the inlet sealing surface on the plasma side support.

10. Module of claim 9 in which the entrances to the blood flow channels uniformly decrease in depth from greater than about 15 mils (0.4 mm) to about 4 to 15 mils (0.1 to 0.4 mm) and the initial width of the entrances is about 4 to 20 mils (0.1 to 0.5 mm).

11. Module of claim 9 in which the plasma and blood flow channels are offset.

12. Module of claim 9 in which the plasma flow channels extend in zones of progressively greater numbers.

13. Module of claim 12 in which the entrances to the blood flow channels uniformly decrease in depth from about 15 to 20 mils (0.4 to 0.5 mm) to about 4 to 10 mils (0.1 to 0.3 mm), the initial width of the entrances is about 4 to 20 mils (0.1 to 0.5 mm) and the cross-sectional area of the entrances remains substantially constant as the channels decrease in depth.

14. Module of claim 13 in which the blood side support has a series of plasma-depleted blood collection channels.

15. Module of claim 13 in which the blood side support has a perimeter border of short narrow channels and the plasma side support has a peripheral sealing surface.

16. Module of claim 15 in which the plasma and blood flow channels are offset.

17. Module of claim 1 which comprises a polycarbonate or polyester membrane having 0.1 to 1.0 μm pores.

18. Module of claim 1 which comprises a plurality of membranes interleaved between a stack of plates including a first and second end plate and at least one intermediate plate, the first end plate having the reciprocatory pulse cavities therein and being a blood side support on its interior surface, the second end plate being a plasma side support on its interior surface and each intermediate plate being a blood side and a plasma side support on opposite surfaces.

19. Module of claim 18 pressed between clamp jaws.

20. Module of claim 18 which is purged of air and filled with liquid.

21. Module of claim 18 which has tube connections to module inlet, plasma outlet and module plasma-depleted blood outlet apertures, mated to the sealing envelope.

22. Module of claim 21 in which there are four to six membranes; the plates are about eight inches in diameter; and, the tube connections are flanged plastic fittings joined to the envelope, which fittings are urged against the envelope and into counterbores around the apertures, all of which are located in one of the end plates, by clamp jaws.

23. Module of claim 22 which further comprises means connected to the module for alternately compressing the envelope over each reciprocatory pulse cavity.

24. Module of claim 21 or 34 in which the means for alternately compressing the envelope comprise a pair of plungers within parallel bores within one jaw of a pair of clamp jaws for clamping the module, springs around the plungers for urging the plungers toward the cavities, and eccentrics on a rotatable shaft extending through the plungers for lifting the plungers 180° out of phase.

* * * * *